(12) United States Patent
Reshetov et al.

(10) Patent No.: US 7,969,437 B2
(45) Date of Patent: Jun. 28, 2011

(54) METHOD AND APPARATUS FOR TRIANGLE REPRESENTATION

(75) Inventors: Alexander V. Reshetov, Saratoga, CA (US); Alexei M. Soupikov, Nizhny Novgorod (RU); Alexander D. Kapustin, Nizhny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 1440 days.

(21) Appl. No.: 11/024,886

(22) Filed: Dec. 28, 2004

(65) Prior Publication Data

US 2006/0139350 A1   Jun. 29, 2006

(51) Int. Cl.
  *G06T 15/50* (2006.01)
(52) U.S. Cl. ......... 345/426; 345/419; 345/420; 345/424
(58) Field of Classification Search ...... 703/2; 708/495; 345/420, 426, 421, 424; 700/182
See application file for complete search history.

(56) References Cited

U.S. PATENT DOCUMENTS

| | | | | |
|---|---|---|---|---|
| 5,734,384 A | * | 3/1998 | Yanof et al. | 345/424 |
| 6,445,390 B1 | * | 9/2002 | Aftosmis et al. | 345/421 |
| 7,336,277 B1 | * | 2/2008 | Clark et al. | 345/426 |
| 7,499,053 B2 | * | 3/2009 | Keller et al. | 345/426 |
| 2002/0184282 A1 | * | 12/2002 | Yuval et al. | 708/495 |
| 2003/0179195 A1 | * | 9/2003 | Ordentlich et al. | 345/420 |
| 2004/0249615 A1 | * | 12/2004 | Grzeszczuk et al. | 703/2 |
| 2005/0285851 A1 | * | 12/2005 | Fossum et al. | 345/419 |
| 2006/0119599 A1 | * | 6/2006 | Woodbury, Jr. | 345/420 |
| 2006/0155418 A1 | * | 7/2006 | Bradbury et al. | 700/182 |

OTHER PUBLICATIONS

Moller et al.,"Fast, minimum storage ray-triangle intersection", Journal of graphics tools, 2(1), 1997, pp. 1-7.
Badouel,"An efficient Ray-Polygon intersection", Graphic Gems, Academic Press Professional, Inc., 1990, pp. 390-393.
Shoemake, Ken, Pluecker Coordinate tutorial, Available at: http://www.acm.org/tog/resources/RTNews/html/rtnv11n1.html#art3, Retrieved on Apr. 9,2010.
Wald et al., "Interactive Rendering with Coherent Ray Tracing", Computer Graphics Group, Saarland University, vol. 20 No. 3, Eurographics 2001, pp. 153-164.

* cited by examiner

*Primary Examiner* — Xiao M Wu
*Assistant Examiner* — Phi Hoang (57) ABSTRACT

Embodiments of the invention provide for accelerated polygon intersection testing of rays against a set of polygons. The amount of computation required in the rendering process is reduced by preprocessing the scene into a data structure that can be more efficiently traversed. During the preprocessing stage, triangles such as triangle may be converted into vertex and edge representation.

12 Claims, 7 Drawing Sheets

METHOD AND APPARATUS FOR TRIANGLE REPRESENTATION

BACKGROUND

Implementations of the claimed invention generally may relate to geometry compression and, more particularly, to accelerating polygon intersection tests required to test effectively a ray against a set of polygons.

Ray tracing is a well known method used in modeling of a variety of physical phenomena related to wave propagation in various media. For example it is used for computing illumination solution in photorealistic computer graphics, for complex environment channel modeling in wireless communication, aureal rendering in advanced audio applications, etc.

A ray is a half line of infinite length originating at a point in space described by a position vector which travels from said point along a direction vector. Ray tracing is used in computer graphics to determine visibility by directing one or more rays from a vantage point described by the ray's position vector along a line of sight described by the ray's direction vector. In most ray-tracing applications, it is necessary to determine the nearest visible surface along that line of sight and coordinates of the ray/surface intersection point. This requires that the ray be effectively tested for intersection against all the geometry within the virtual scene and retain the nearest intersection.

BRIEF DESCRIPTION OF THE DRAWINGS

The accompanying drawings, which are incorporated in and constitute a part of this specification, illustrate one or more implementations consistent with the principles of the invention and, together with the description, explain such implementations. The drawings are not necessarily to scale, the emphasis instead being placed upon illustrating the principles of the invention. In the drawings

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of the claimed invention. However, it will be apparent to those skilled in the art having the benefit of the present disclosure that the various aspects of the invention claimed may be practiced in other examples that depart from these specific details. In certain instances, descriptions of well known devices, circuits, and methods are omitted so as not to obscure the description of the present invention with unnecessary detail.

Figure 1:
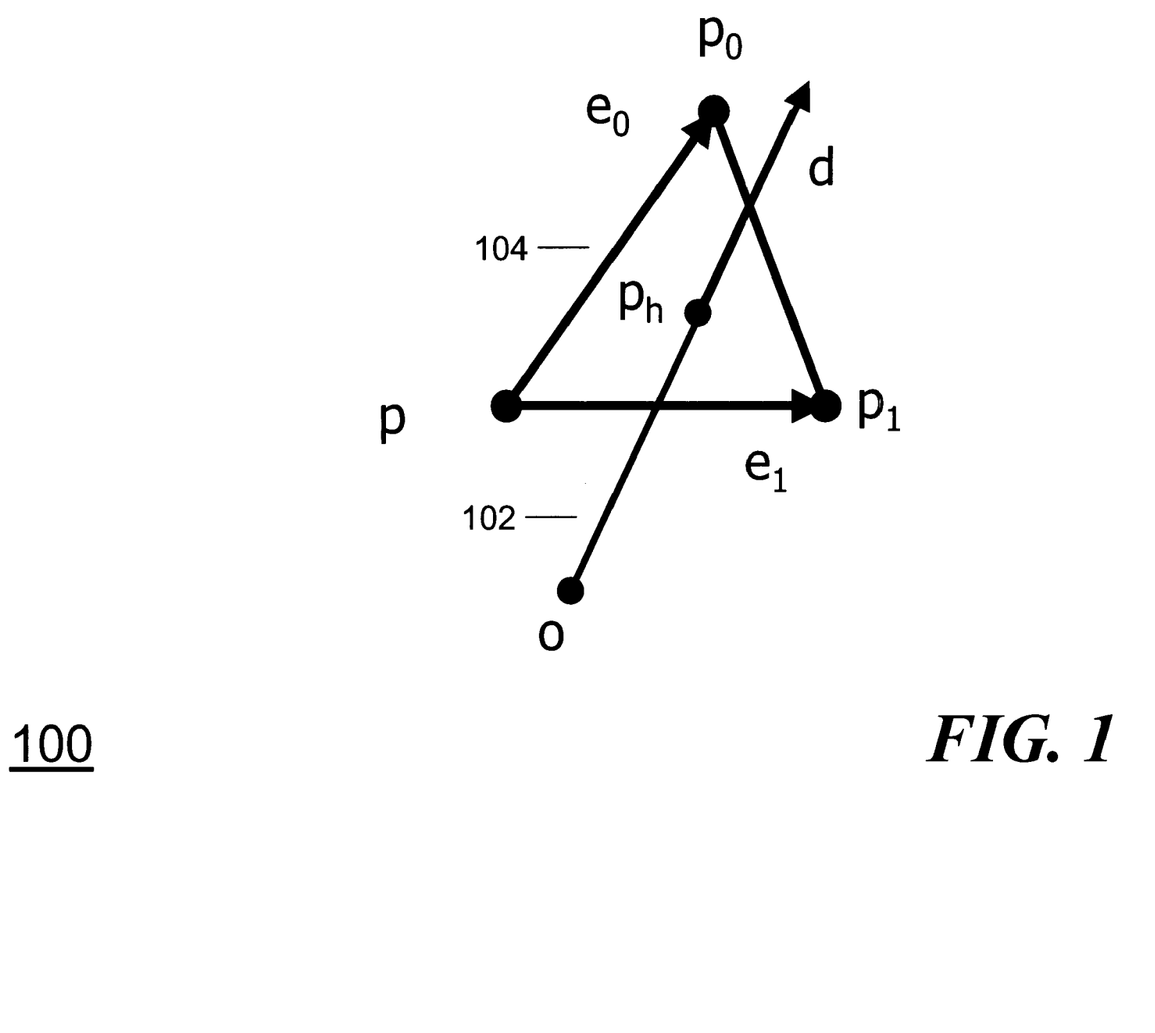
FIG. 1 illustrates an example configuration of a ray and triangle.

Embodiments of the invention provide for accelerated polygon intersection testing of rays against a set of polygons. The amount of computation required in the rendering process is reduced by preprocessing the scene into a data structure that can be more efficiently traversed. FIG. 1 illustrates an example configuration 100 of ray 102 and triangle 104. During the preprocessing stage, triangles such as triangle 104 may be converted into vertex and edge representation. For example, referring to FIG. 1, triangle 104 may be defined by vertices p, p0 and p1, or a vertex p and two edges e0 and e1. Ray 102 is defined by its origin o and direction d. The ray-triangle intersection point $P_h$ may be defined by the following equation:

$$P_h = o + td \quad \text{(Eq. 1)}$$

where t is a scalar value (distance along the ray)

This provides for conversion into a data structure, where values are stored. In particular, the required information about a triangle, including but not limited to triangle vertex, two edges, triangle normal, for fast test and computation of a ray-triangle intersection is provided.

Figure 2:
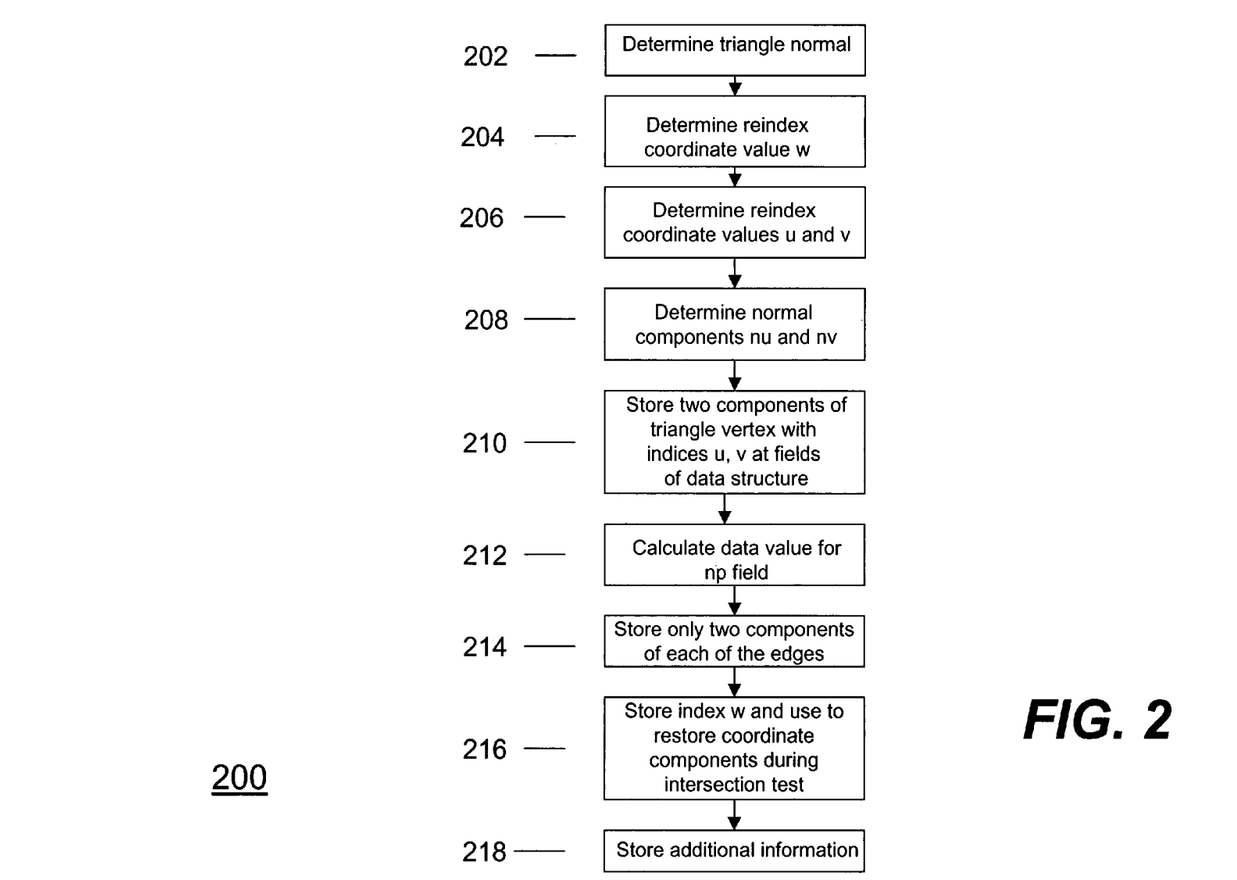
FIG. 2 is a flow chart illustrating an example for determining pre-processed triangle values.

FIG. 2 is a flow chart illustrating a process 200 for determining preprocessed triangle values. In one implementation, full information about a triangle may be compressed to only 9 floating point values.

3 bit ci;
Float nu;
Float nv;
Float np
Float pu;
Float pv;
Float e0u;
Float e0v;
Float e1u;
Float e1v In particular, triangle information may be packed into 9 floating point values plus 3 bits, based on re-indexing coordinates, scaling normal and using only necessary pre-computed values. Stored pre-computed information may be compressed to only a necessary set of values by dropping off redundant information. Values may be dropped off and need not stored without reducing the performance of intersection algorithm.

a. In act 202, the triangle normal is determined in accordance with:

$$n = (n_0, n_1, n_2)$$

One of the normal components may be assumed to be equal to 1.0 and need not to be stored since the intersection algorithm presented does not require any specific normal length. As a result, the largest magnitude normal component may be selected and all appropriate values may be scaled by an inverse of this component.

The re-index coordinates w, u, v are determined in acts 204 and 206.

In particular, in act 204, the index of this component, w, is determined and stored for further usage. In particular, the index w may be defined by the maximum of the absolute value of the triangle normals n0, n1 and n2.

$$n_w = \max(abs(n_i))$$

where i=0, 1, 2

In act 206, the two remaining components u, v are uniquely determined by using clauses u<v and u+v+w=3

The triangle parameters are determined in acts 208 to 216. In act 208, the stored components of the normal, nu and nv, are determined in accordance with:

$nu = n_u/n_w$ $nv = n_v/n_w$

The largest magnitude is not a necessary condition for selection of the dropped normal component. Rather, any non-zero component may be used. In some implementations, a small magnitude may affect precision.

b. In act 210, the two components of triangle vertex p with indices u, v are stored at pu and pv fields of the data structure in accordance with $pu = p_u$ $pv = p_v$ where np may be just pw, with appropriate changes in intersection algorithm.

In act 212, the data value for the np field may be calculated in accordance with $np = (nu*pu + nv*pv + p_w)$ The dot product of vertex p and modified (scaled) triangle normal is stored at np field. It is possible to just store the $p_w$ component of p instead of dot product, but dot product storage allows additional operations to be saved and allows better register usage on the test/intersection stage.

c. In act 214, only two components (having indices u and v) of each of the edges ($e_0$, $e_1$) need to be stored, resulting in storing only 4 (e0u, e0v, e1u, e1v), rather than 6, floating point values. In particular, although the edge is a 3D vector, the component having index w (as noted above) need not to be stored. Properly scaled components of $e_0$ (e0u, e0v) and $e_1$ (e1u, e1v) may be calculated as follows:

$e0u = (-1)^w e_{0u}/n_w$ $e0v = (-1)^w e_{0v}/n_w$ $e1u = (-1)^w e_{1u}/n_w$ $e1v = (-1)^w e_{1v}/n_w$ d. In act 216, the index w may be stored and used to restore the coordinate components indexing during the intersection test/calculation stage. In some implementations, only 2 bits are required to store w (since for 3D vectors it takes values 0, 1, 2). Two other indices u and v may be restored by taking one of the rules (u<v) or (v<u) as a convention used throughout preprocessing and intersection test/calculation stages. The field where the 2-bit w value is stored may be referred to as ci.

e. In act 218, additional information about triangle orientation may also be stored. The triangles that have two zero components of normal are detected by a preprocessing algorithm and one bit may be allocated in the ci field as an indicator of this particular triangle type. The intersection test with this particular triangle type is typically computationally simpler, requires less register space and the size of the data structure of such triangle may be reduced. This particular triangle type has simple geometrical interpretation: it is the triangle orthogonal to one of the coordinate axis (axis-orthogonal triangle). The major portion of in-door scenes or out-door scenes containing buildings have such triangles which define the surfaces of walls, ceilings, windows, etc. For in-door scenes, actual measurements may indicate that more than 50% of rays hit such type of triangles.

Figure 3:
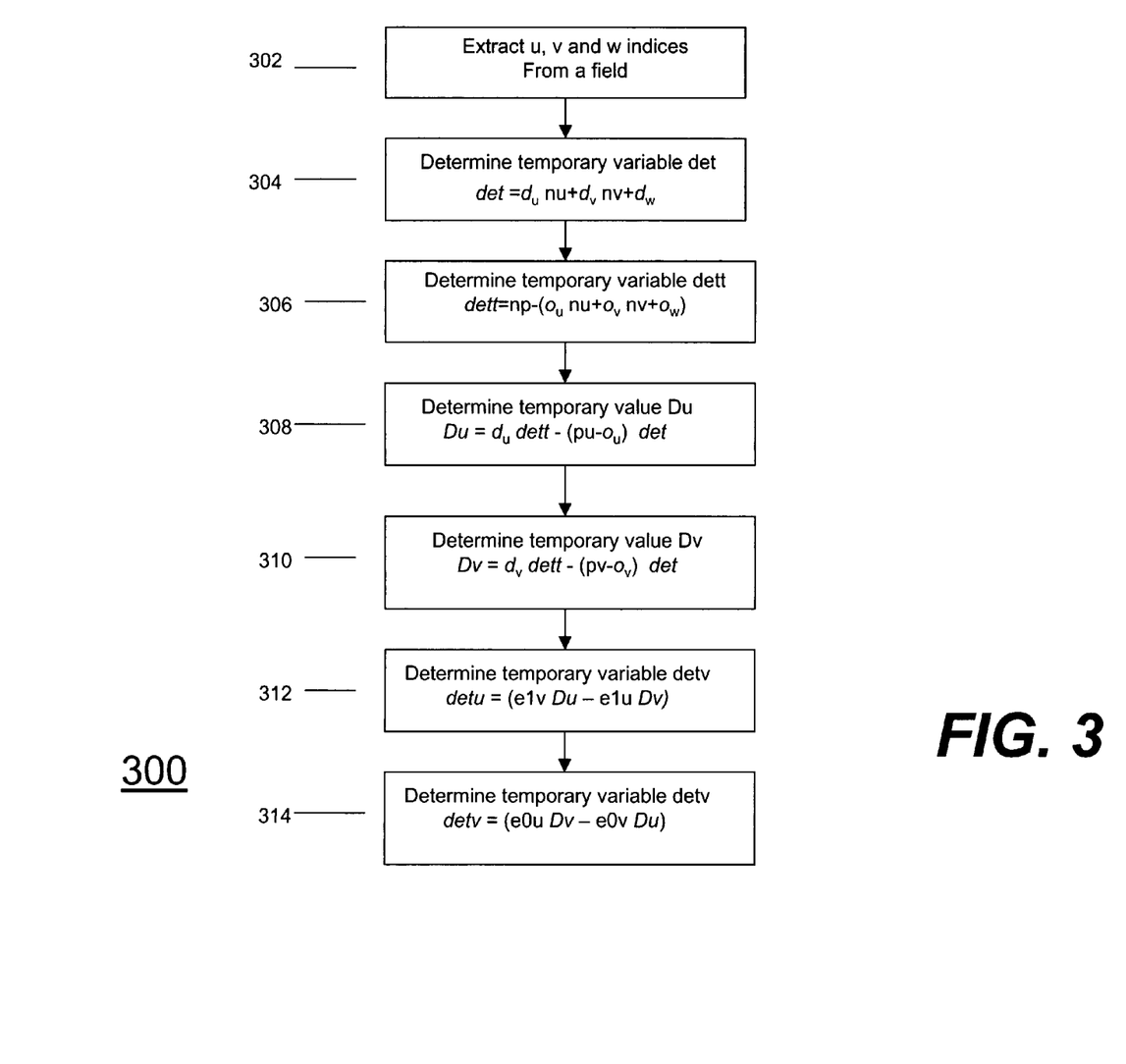
FIG. 3 is a flow chart illustrating a process for determining variable values for a fast step intersection test for any triangle.

FIGS. 3-6 are flow charts illustrating ray intersection tests utilizing preprocessed values. For illustrative purposes, equations follow traditional mathematical notation i.e. multiplication sign between values is omitted (for example, $d_u$nu means $d_u$*nu or $d_u$ multiplied by nu). In particular, axis-orthogonal triangles are detected and processed separately. The triangle interior hit test is performed first. The distance to the intersection is computed only if the hit test passed. FIG. 3 is a flow chart 300 illustrating a process for determining variable values for a fast step intersection test for any triangle. Using three edges of a triangle, a ray calculation is determined against each edge and whether the ray is clockwise or counterclockwise with respect to the edge is determined. The ray intersects the triangle only when the ray is inside the triangle. "det", "dett", "detu", "detv" are temporary variables introduced for efficient computation re-use. Their naming was selected to illustrate mathematical sense of computed values. For example, "det" is a value proportional to determinant of the linear system of ray-triangle intersection equations. These values are used further for determining whether ray intersects triangle (ray goes inside the triangle) and calculation of intersection parameters "hit.u", "hit.v" and "hit.t" in case of intersection. "Du" and "Dv" are temporary values introduced for efficient computation re-use.

In act 302, u, v and w indices are extracted from a field, such as ci. As noted above, the index w may be stored and used to restore the coordinate components indexing during the intersection test/calculation stage. u, v and w may be extracted various ways. For example, w=two lower bits of ci field, then u=1 if w>0 and u=0 otherwise, v=3−w−u. In another example, a look up table may also be used to determine u, v by a given w.

Figure 4:
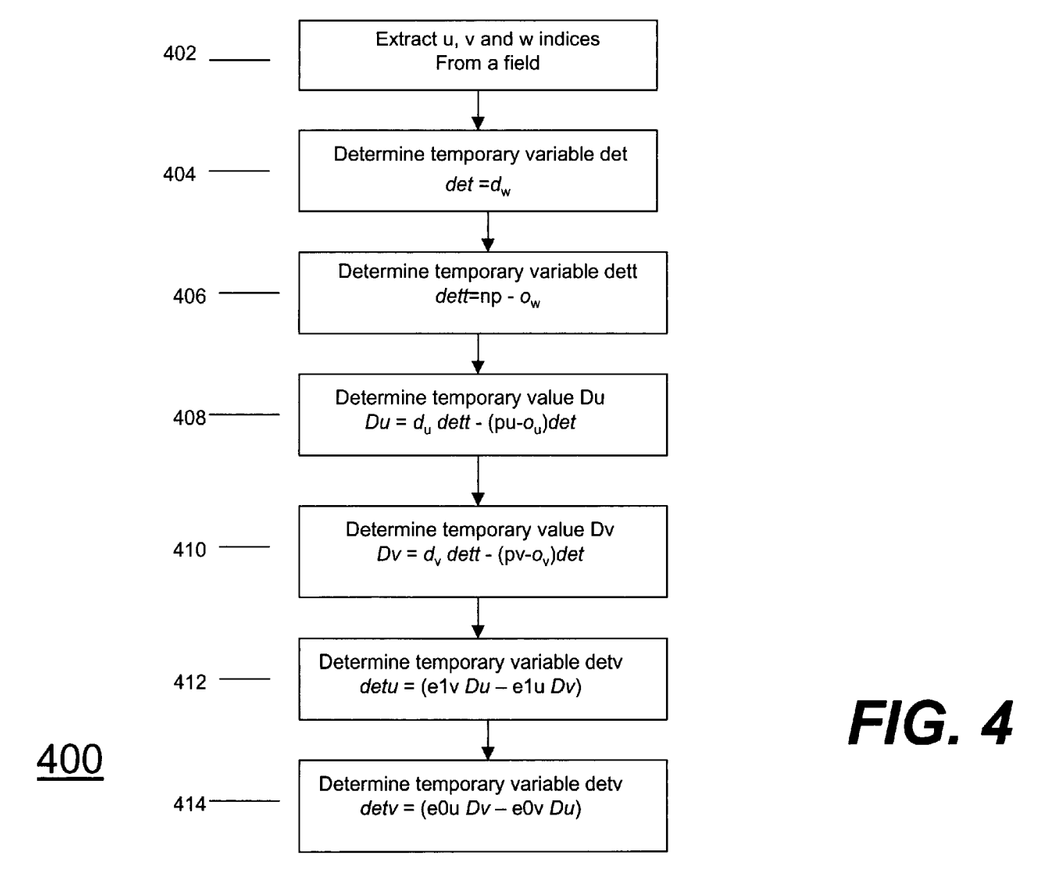
FIG. 4 is a flow chart illustrating a process for determining variable values for a fast step intersection test for an axis-orthogonal triangle.

In act 304, temporary variable det may be determined in accordance with $det = d_u nu + d_v nv + d_w$ In act 306, temporary variable dett may be determined in accordance with $dett = np - (o_u nu + o_v nv + o_w)$ In act 308, temporary value Du may be determined in accordance with $Du = d_u dett - (pu - o_u) det$ In act 310, temporary value Dv may be determined in accordance with $Dv = d_v dett - (pv - o_v) det$ In act 312, temporary variable detu may be determined in accordance with $detu = (e1v Du - e1u Dv)$ In act 314, temporary variable detv may be determined in accordance with $detv = (e0u Dv - e0v Du)$ FIG. 4 is a flow chart 400 illustrating a process for determining variable values for a fast step intersection test for an axis-orthogonal triangle. An axis-orthogonal triangle may be defined as a triangle orthogonal to one of the coordinate axis (axis-orthogonal triangle). nu and nv are set to zero for axis-aligned triangle calculations.

In act 402, u, v and w indices are extracted from a field, such as ci. The values may be extracted in a similar manner as discussed above and shown in FIG. 3 (act 302).

In act 404, temporary variable det may be determined in accordance with $$det = d_w$$

In act 406, temporary variable dett may be determined in accordance with $$dett = np - o_w$$

In act 408, temporary value Du may be determined in accordance with $$Du = d_u dett - (pu - o_u) det$$

In act 410, temporary value Dv may be determined in accordance with $$Dv = d_v dett - (pv - o_v) det$$

In act 412, temporary variable detu may be determined in accordance with $$detu = (e1vDu - e1uDv)$$

In act 414, temporary variable detv may be determined in accordance with $$detv = (e0uDv - e0vDu)$$

Figure 5:
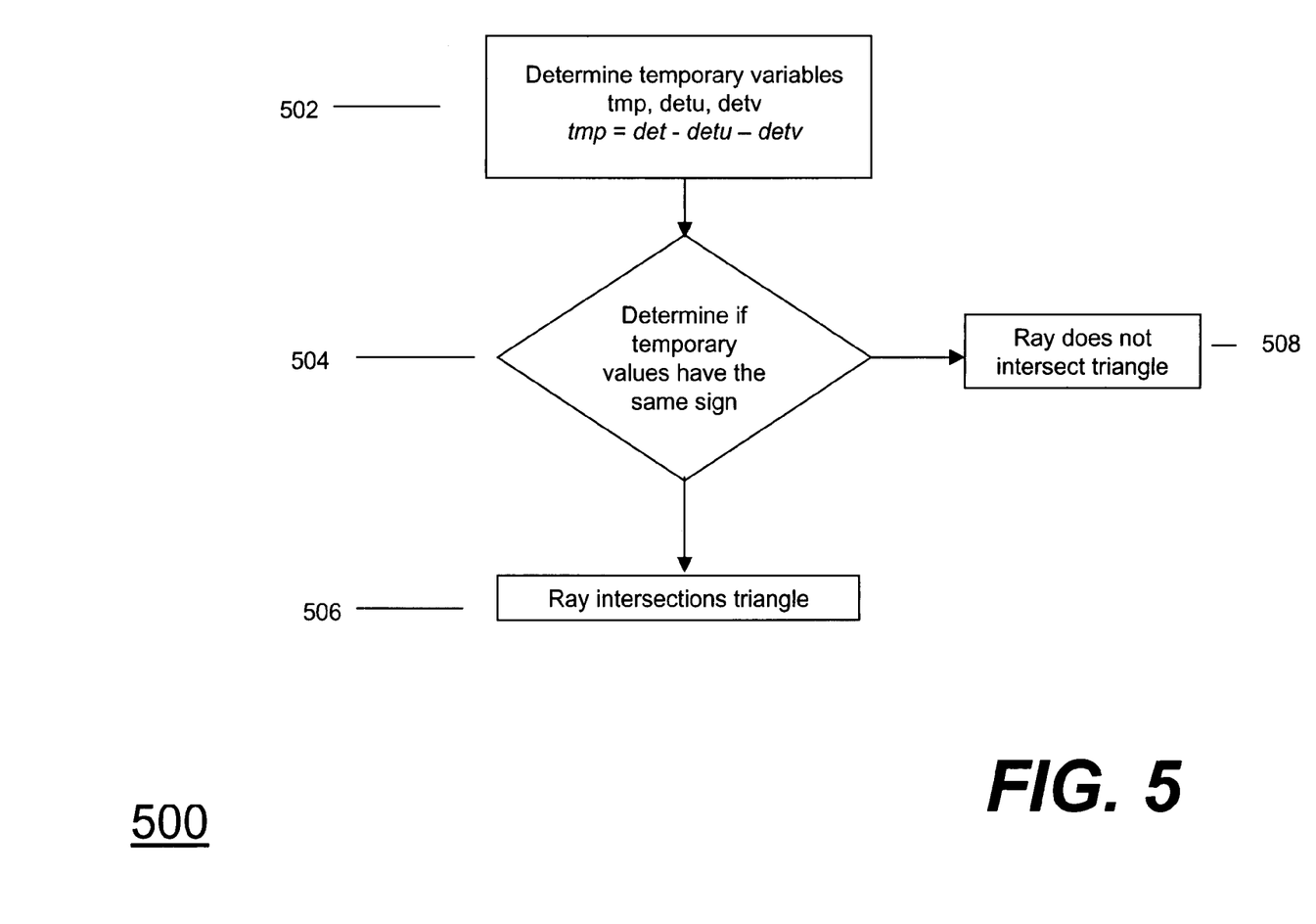
FIG. 5 is a flow chart illustrating a process for determining whether a ray intersects a triangle using the values determined in FIG. 3 or FIG. 4.

FIG. 5 is a flow chart illustrating a process 500 for determining whether a ray intersects a triangle using the values determined in FIG. 3 or FIG. 4. In particular, FIG. 5 illustrates how "det", "detu", "detv" values computed as discussed above and shown in FIG. 3 or FIG. 4 may be used to determine whether a ray intersects a triangle. "hit_triangle" may represent a Boolean variable with value "true" if the ray intersects a triangle and "false" if the ray does not intersect a triangle. Alternatively, "hit_triangle" may be some other equivalent of logical variable depending on the specific implementation (such as a bit mask with all bits set to 1s in case of hit and to 0s otherwise). "tmp" may represent a temporary variable introduced for efficient computation re-use. In accordance with embodiments of the invention, a ray intersects a triangle if values (det-detu-detv), detu and detv have the same sign simultaneously.

In act 502, temporary variable tmp may be determined in accordance with $$tmp = det - detu - detv$$

In act 504, it is determined whether variables (det-detu-detv), detu and detv have the same sign simultaneously. Boolean variable hit_triangle may be determined in accordance with hit_triangle=(tmp>=0 AND detu>=0 AND detv>=0)
OR (tmp<=0 AND detu<=0 AND detv<=0)

In act 506, ray intersects triangle if the variables have the same sign simultaneously. In particular, the intersection test is passed if "hit_triangle" is "true" and not passed otherwise.

In act 508, if the variables have the same sign simultaneously, ray does not intersect triangle.

Figure 6:
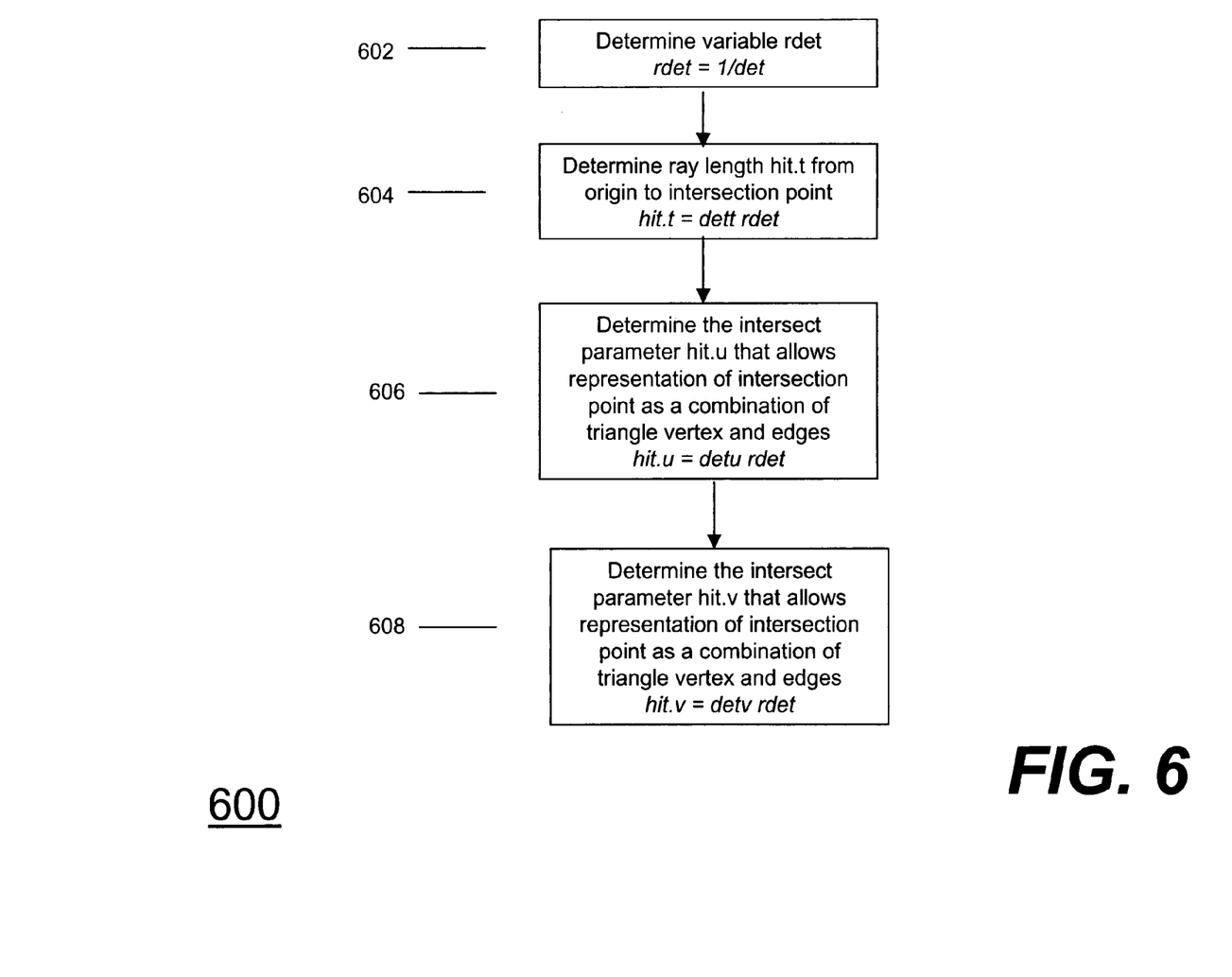
FIG. 6 is a flow chart illustrating a process for calculating position of intersection and other parameters.

Determining the position of intersection (such as shown in FIG. 6) and associated intersection parameters is not necessary if it is determined a ray does not intersect a triangle thus saving computations.

FIG. 6 is a flow chart illustrating a process 600 for calculating position of intersection and other parameters. After it is determined that a ray intersects a triangle, the exact position of intersection may be desired. "hit.t" may represent the ray length from origin to intersection point. "hit.u" and "hit.v" may represent intersection point parameters that allow representation of intersection point as a linear combination of triangle vertex and edges (i.e. intersection point $p_h = p + e_0 hit.u + e_1 hit.v$). These values may be referred to as barycentric coordinates and used in ray tracer for further processing (such as computation of texture coordinates, normal interpolation and so forth). "rdet" may represent a temporary variable for efficient computation re-use. It may store a reciprocal value of "det" (i.e. one divided by det). The following process solves a linear system of ray-triangle intersection equations using Kramer's rule.

In act 602, temporary variable rdet may be determined in accordance with $$rdet = 1/det$$

In act 604, the ray length hit.t from origin to intersection point may be determined in accordance with hit.t = dett rdet In act 606, "hit.u", the intersection point parameter that allows representation of intersection point as a linear combination of triangle vertex and edges, may be determined in accordance with hit.u = detu rdet In act 606, "hit.v", the intersection point parameter that allows representation of intersection point as a linear combination of triangle vertex and edges, may be determined in accordance with hit.v = detv rdet The triangle interior intersection test is performed and the distance of intersection is computed only if the intersection test passed.

One branch or no branches for the whole intersection test/calculation may be used. In particular, a branchless implementation may be used if the mask is generated on the results of computation. A version with branch could be implemented, for example, as C/C++ construction: if (hit_triangle) (FIG. 6). In case of computation device with in-efficient or impossible branches (for example, shading module of GPU) branch-less implementation is possible by performing the process shown in FIG. 6 in both cases (intersection and no intersection) plus using additional bit-wise logical operations and representing of "hit_triangle" variable as bit mask.

Figure 7:
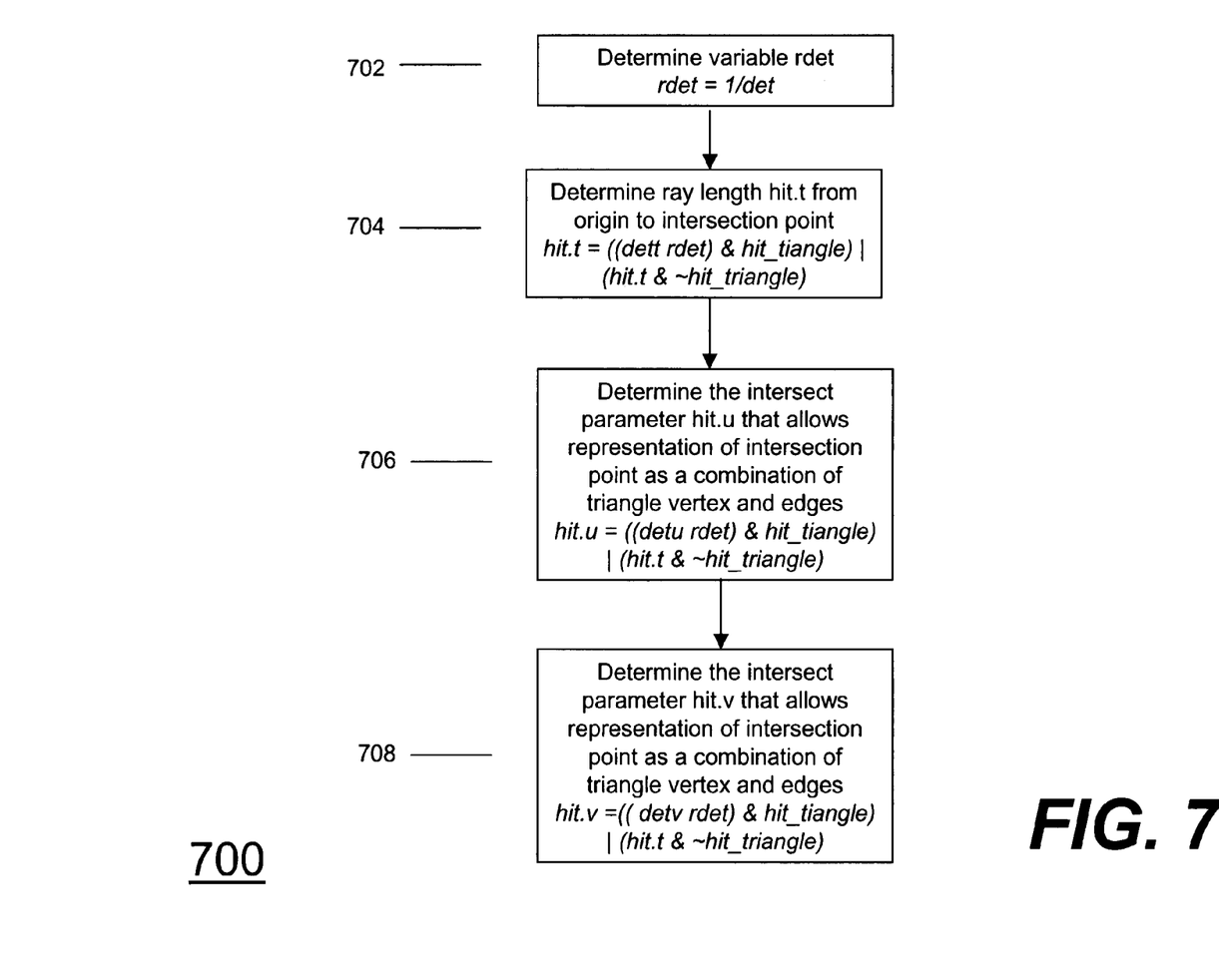
FIG. 7 is a flow chart illustrating a process for calculating position of intersection and other parameters in a branchless implementation.

FIG. 7 is a flow chart illustrating a process 700 for calculating position of intersection and other parameters in a branchless implementation. "hit_triangle" may represent a bit mask with for example, all 1s in case of hit and all 0s otherwise. "|" may represent a bit-wise OR operation, "&" may represent a bit-wise AND operation, and "~" may represent a bit wise NOT operation equivalent to those in C/C++. Mask "hit_triangle" may be used to either store the intersection parameters with a given triangle into "hit.t", "hit.u", "hit.v" variables or keep their values unchanged.

In act 702, temporary variable rdet may be determined in accordance with $$rdet = 1/det$$

In act 704, the ray length hit.t from origin to intersection point may be determined in accordance with hit.t = ((dett rdet) & hit_tiangle)|(hit.t & ~hit_triangle)

In act 706, "hit.u", the intersection point parameter that allows representation of intersection point as a linear combination of triangle vertex and edges, may be determined in accordance with $$hit.u = ((detu\ rdet)\ \&\ hit\_tiangle) | (hit.t\ \&\ {\sim}hit\_triangle)$$

In act 708, "hit.v", the intersection point parameter that allows representation of intersection point as a linear combination of triangle vertex and edges, may be determined in accordance with $$hit.v = ((detv\ rdet)\ \&\ hit\_tiangle) | (hit.t\ \&\ {\sim}hit\_triangle)$$

Although system 100 is illustrated as including discrete components, these components may be implemented in hardware, software/firmware, or some combination thereof. When implemented in hardware, some components of system 100 may be combined in a certain chip or device.

Moreover, embodiments may provide a non-transitory machine accessible medium medium including instructions that, when executed, cause a machine to perform the techniques described herein. For instance, the instructions may cause the machine to convert a triangle into vertex and edge representation; pack triangle information into floating point values based on re-indexing coordinates, scaling normal and using only necessary pre-computed values; determine variable values based upon the floating point values; determine whether a ray intersects the triangle using the variable values; in response to the ray intersecting the triangle, determine a distance of intersection in response to the ray intersecting a triangle interior; and compute barycentric coordinates of a point of the intersection. Also, the instructions may cause the machine to use one or no branches for an intersection calculation.

Although several exemplary implementations have been discussed, the claimed invention should not be limited to those explicitly mentioned, but instead should encompass any device or interface including more than one processor capable of processing, transmitting, outputting, or storing information. Processes may be implemented, for example, in software, stored on a non-transitory machine accessible medium that may be executed by processors or another portion of local system.

The foregoing description of one or more implementations consistent with the principles of the invention provides illustration and description, but is not intended to be exhaustive or to limit the scope of the invention to the precise form disclosed. Modifications and variations are possible in light of the above teachings or may be acquired from practice of various implementations of the invention.

No element, act, or instruction used in the description of the present application should be construed as critical or essential to the invention unless explicitly described as such. Also, as used herein, the article "a" is intended to include one or more items. Variations and modifications may be made to the above-described implementation(s) of the claimed invention without departing substantially from the spirit and principles of the invention. All such modifications and variations are intended to be included herein within the scope of this disclosure and protected by the following claims.

What is claimed:

1. A method for triangle representation, comprising:
a computation device converting a triangle into vertex and edge representation;
the computation device packing triangle information into floating point values based on re-indexing coordinates, scaling normal and using only necessary pre-computed values;
the computation device determining variable values based upon the floating point values;
the computation device determining whether a ray intersects the triangle using the variable values;
in response to the ray intersecting the triangle, the computation device determining a distance of intersection in response to the ray intersecting a triangle interior;
the computation device computing barycentric coordinates of a point of the intersection; and
the computation device using one or no branches for an intersection calculation;
wherein using one or no branches for an intersection calculation further comprises the computation device implementing a branchless implementation by generating mask on results of computation.

2. The method claimed in claim 1, wherein determining variable values based upon the floating point values further comprises:
determining variable values for axis-orthogonal triangles.

3. The method claimed in claim 2, wherein determining variable values further comprises:
for axis-orthogonal triangles, setting u and v components of a triangle normal to zero.

4. The method claimed in claim 3, further comprising:
detecting axis-orthogonal triangles and processing them separately.

5. The method claimed in claim 1, wherein converting the triangle into vertex and edge representation further comprises:
defining the triangle by its three vertices, or by a vertex and two edges; and
defining a ray by its origin o and direction d.

6. The method claimed in claim 1, wherein packing triangle information into floating point values based on re-indexing coordinates, scaling normal and using only necessary pre-computed values further comprises:
packing triangle information into 9 or less floating values plus bits.

7. A non-transitory machine accessible medium including instructions that, when executed, cause a machine to:
convert a triangle into vertex and edge representation;
pack triangle information into floating point values based on re-indexing coordinates, scaling normal and using only necessary pre-computed values;
determine variable values based upon the floating point values; determine whether a ray intersects the triangle using the variable values; in response to the ray intersecting the triangle, determine a distance of intersection in response to the ray intersecting a triangle interior;
compute barycentric coordinates of a point of the intersection; and
use one or no branches for an intersection calculation;
wherein using one or no branches for an intersection calculation further comprises implementing a branchless implementation by generating a mask on results of computation.

8. The non-transitory machine accessible medium claimed in claim 7, wherein instructions to determine variable values based upon the floating point values further comprises instructions, when executed, cause a machine to:
detect axis-orthogonal triangles and process them separately; and
determine variable values for axis-orthogonal triangles.

9. The non-transitory machine accessible medium claimed in claim 7, wherein packing triangle information into floating point values based on reindexing coordinates, scaling normal and using only necessary pre-computed values further comprises instructions, when executed, cause a machine to:

pack triangle information into 9 or less floating point values plus bits.

10. An apparatus comprising:

one or more processors to convert a triangle into vertex and edge representation, pack triangle information into floating point values based on re-indexing coordinates, scale normal and using only necessary pre-computed values, determine variable values, determine whether a ray intersects the triangle using variable values, in response to the ray intersecting the triangle, determine distance of intersection in response to the ray intersecting a triangle interior, compute barycentric coordinates of a point of the intersection, and use one or no branches for an intersection calculation;

wherein using one or no branches for the intersection calculation further comprises implementing a branchless implementation by generating a mask on results of computation.

11. The apparatus claimed in claim 10, wherein the one or more processors is to further detect axis-orthogonal triangles and process them separately and determine variable values for axis-orthogonal triangles.

12. A system, comprising:

one or more processors to convert a triangle into vertex and edge representation, pack triangle information into floating point values, determine variable values, determine whether a ray intersects the triangle using variable values, in response to the ray intersecting the triangle, determine distance of intersection in response to the ray intersecting a triangle interior, compute barycentric coordinates of a point of the intersection, and use one or no branches for an intersection calculation, wherein using one or no branches for the intersection calculation further comprises implementing a branchless implementation by generating a mask on results of computation; and a memory to store the values.

* * * * *